United States Patent [19]

Zucchini

[11] Patent Number: 4,637,232

[45] Date of Patent: Jan. 20, 1987

[54] APPARATUS FOR THE RECYCLING OF SOLVENT USED IN DRY-CLEANING MACHINES AND SIMILAR EQUIPMENT

[75] Inventor: Guido Zucchini, Castelmaggiore, Italy

[73] Assignee: AMA Universal S.p.A., Castelmaggiore, Italy

[21] Appl. No.: 720,752

[22] Filed: Apr. 8, 1985

[51] Int. Cl.[4] .............................................. D06F 43/08
[52] U.S. Cl. .................................... 68/18 R; 68/18 C
[58] Field of Search ................. 8/142; 68/18 R, 18 C; 134/12, 109; 202/170, 174; 203/25

[56] References Cited

U.S. PATENT DOCUMENTS 1,995,064  3/1935  Hetzer ................................. 68/18 R
3,177,126  4/1965  Charreau ....................... 202/170 X

FOREIGN PATENT DOCUMENTS 31971  7/1981  European Pat. Off. ............ 68/18 C
422427  1/1935  United Kingdom ............... 68/18 R Primary Examiner—Philip R. Coe
Attorney, Agent, or Firm—Balogh, Osann, Kramer, Dvorak, Genova & Traub

[57] ABSTRACT

The invention relates to machines for dry-cleaning clothes, and the like, and in particular, concerns an apparatus for the treatment of solvents by recycling carried out in the machine. The apparatus according to the invention comprises a predistillation unit (8), located between the main distillation chamber (2) and condenser (3) and consisting of a tank (9) in direct receipt of mingled water and solvent from the cleaning cycle, which it discharges into the chamber in controlled fashion, and a heat exchanger (10) located within the tank, in receipt of vapor from the chamber which it channels into the condenser. Connection between the tank and the condenser is direct, in order that vapor produced by pre-distillation may be exhausted straight into the condenser.

4 Claims, 1 Drawing Figure

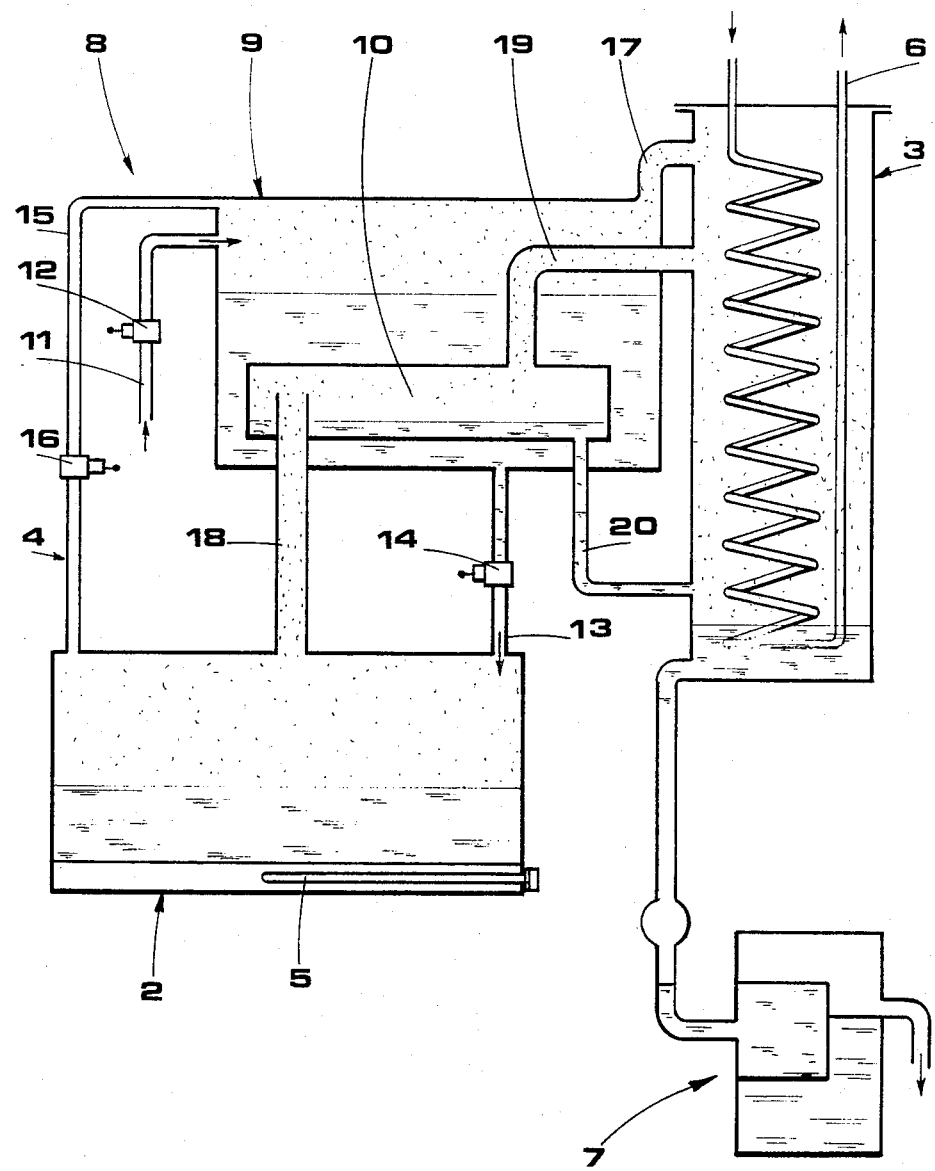

APPARATUS FOR THE RECYCLING OF SOLVENT USED IN DRY-CLEANING MACHINES AND SIMILAR EQUIPMENT

BACKGROUND OF THE INVENTION

The invention relates to an apparatus for recycling solvent of the type utilized in dry-cleaning machines and in other similar machinery or equipment.

As one having ordinary skill in the art will be aware, the majority of dry-cleaning machines utilizing solvent, such as perchloroethene, incorporate a system capable of recycling such solvent following one or more cleaning cycles.

Recycling of the solvent is essential if the cost of cleaning is to be kept within competitive limits, and must be carried out according to a precise technique and in an efficient manner in order to avoid pollution of drains and sewers by the waste solvent, and to ensure that vapor given off by the solvent does not contaminate the environment where the machine is sited.

Recycling of solvent comes about as follows: water and solvent mingled during the cleaning cycle are fed into a chamber fitted with heater elements, and are vaporized, whereupon the vapor given off distils in a condenser. The liquid produced flows into a separator which draws off the water and channels the solvent back into the machine. Impurities collected by the liquid during cleaning remain in the chamber.

The above process is efficient enough as regards production of purified solvent for recycling purposes, but is considerably expensive and time-consuming. Such a process also jeopardizes service-life of the apparatus, since heat generated in the chamber for evaporation of the mingled water and solvent (perchloroethene in particular) is wasted entirely, and what is more, dictates the requirement for a copious flow of water by means of which to cool the condenser. Moreover, time available in which to evaporate the liquid is relatively short, and substantially the same amount of heat must be generated for each recycle, and the same time-lapse allowed, in order to distil the bulk of mingled water and solvent in its entirety.

The most serious drawback, however, in systems of the type described, is that relatively high temperatures are produced in the chamber due to the use of electric immersion heaters and the like: for example, the boiling point of pure perchloroethene, 121° C., will be reached easily in the chambers of such conventional systems, and temperatures of this order, combined with the characteristics of the mingled water and solvent being distilled, represent a marked corrosion hazard to the walls of the chamber. When mingled, water and chlorine give place to acidity, as water permits the formation of free chlorine ions; in practical terms, the water becomes a 'vehicle' for acidity, a minus factor which increases a magnitude the higher the temperature.

Damage to the chamber walls is made still worse by the thermal shock produced on introduction thereinto of a fresh batch of liquid, which enters at room temperature substantially, no sooner than the previous recycle has terminated and the chamber walls are still invested with heat of the order mentioned above. This terminal shock gives place to a further shock which occurs in the system's internal pressure, since the sudden temperature drop occasions immediate condensation of such vapor as still remains in the chamber, producing a depression in the chamber itself, and although conventional systems of the type incorporate valves to offset the pressure drop by drawing-in air from the environment, such a remedy is negative in practice by reason of the fact that small though nonetheless damaging emissions of solvent vapor are let out into the environment during recycle.

It is a fundamental object of the invention, in view of the state of the art, to provide an apparatus for the recycling of solvent utilized in dry-cleaning machines and similar equipment such as will avoid the drawbacks described above.

SUMMARY OF THE INVENTION

The fundamental object stated is realized to all intents and purposes by the invention disclosed, which relates to an apparatus for the recycling of solvent used in dry-cleaning machines and similar equipment, of a general type comprising: a distillation chamber with heater elements and a water and solvent vapor condenser, together with controls and plumbing for handling of the liquids and vapor which pass through the chamber and condenser, characterized: in that it further comprises a pre-distillation unit located between the chamber and the condenser consisting of a tank in direct receipt of mingled water and solvent from the cleaning cycle, which it discharges in controlled fashion into the chamber, and a heat exchanger located within the tank, in receipt of vapor from the chamber which it channels into the condenser; and in that the connection between the tank and the condenser is direct, in order that vapor produced by pre-distillation of the azeotropic mixture of water and solvent may be exhausted into the condenser.

BRIEF DESCRIPTION OF THE DRAWINGS

Additional features and advantages of the invention will emerge from the description of a preferred embodiment which follows, when read in conjunction with the accompanying drawing, which is a general view of an apparatus according to the invention, seen in section and in isolation.

DESCRIPTION OF THE PREFERRED EMBODIMENT

The drawing illustrates an apparatus according to the invention, which comprises the chamber 2, the condenser 3, and the controls and plumbing 4 for handling liquid and vapor, which are features of the conventional systems referred to in the foregoing.

The chamber 2 is substantially in the form of a vessel and is provided with heater elements 5, electric for instance, located in its base. The condenser 3 communicates with the chamber 2 by way of the controls and plumbing 4 aforementioned, and is provided with a coil 6 through which water is caused to circulate.

Liquid produced by condensation in the condenser is directed into a separator 7 of the conventional type, where the mingled water and solvent are separated, with water being discharged and solvent being recycled back to the machine.

In the apparatus according to the invention, one has a pre-distillation unit, located between the chamber 2 and the condenser 3 and consisting, in substance, of a tank 9, and a heat exchanger 10 located inside the tank. The tank 9 is in direct receipt, by way of a first pipeline 11 and a first solenoid valve 12, of mingled water, solvent and impurities directed into the apparatus on completion of a given cleaning cycle by the dry-cleaning machine of which it forms an integral part. The tank 9 also connects with the chamber 2 via a second pipeline 13 and a second solenoid valve 14, this second pipeline being connected to the bottom of the tank 9 in order to serve as a discharge from tank to chamber. The tank is also provided with an overflow pipe 15 controlled by a third solenoid valve 16, which likewise connects the tank with the chamber 2.

The pre-distillation unit also comprises a duct 17 of relatively large dimensions which joins the tank 9 and the condenser 3 in direct fashion.

The heat exchanger 10 located inside the tank 9 likewise connects both with the condenser 3 and with the chamber 2 in direct fashion; a first pipe 18, departing from the top outlet of the chamber 2, passes through the tank 9, and extends into the heat exchanger 10, whilst a second pipe 19, departing from the top of the heat exchanger 10, connects with the condenser 3. The unit also incorporates a third pipe 20 departing from the bottom of the heat exchanger 10 and connecting with the bottom of the condenser 3. The three pipes 18, 19 and 20 are altogether free of control components, valves, etc.

Operation of the apparatus disclosed, embodied as described above, and assuming the solvent distilled to be perchloroethene, is as follows...

With the dry-cleaning machine started up and in service, the normal working cycle of the apparatus is such that, while a certain quantity of fluid undergoes heating in the chamber 2, the pre-distillation tank 9 will be in receipt of mingled water, solvent and impurities, at room temperature, direct from the dry-cleaning machine by way of first pipeline 11. This mixture enters the tank 9 only when the second solenoid valve 14 is in closed position, thereby denying access into the chamber from the tank except by way of the overflow pipe 15, which is kept normally open. Fluid thus introduced into the tank 9 is warmed by the heat exchanger 10 through which evaporated fluid heated in the chamber 2 exhausts to the condenser. Such heated fluid and the vapor given off therefrom will reach a temperature of approximately 121° C., as becomes clear in due course, and fluid in the tank 9 is raised to a temperature of approximately 87° C. by the gradual heating process thus induced.

At this nominal temperature, the azeotropic mixture of perchloroethene and water will begin vaporizing, the mingled water and solvent in fact forming a stable mixture whose boiling point is 87° C. This stable mixture forms only a part of the fluid content of the tank 9, as the quantity of water is relatively small in relation to that of the perchloroethene utilized in cleaning. During the boiling stage, temperature inside the tank 9 remains steady and vapor given off by the azeotropic mixture is directed straight into the condenser via duct 17, there to be returned to the liquid state and flow out into the separator 7, where water and solvent are separated.

The difference in temperature between vapor given off from within the chamber 2 and exhausted through the heat exchanger 10, and fluid contained in the tank 9, is such as to bring about a partial condensation within the heat exchanger 10; the liquid thus produced discharges from the exchanger toward the bottom of the condenser 3 by way of third pipe 20.

Once the entire water content of the tank 9 has been evaporated as part of the azeotropic mixture formed thereby with the perchloroethene, fluid remaining in the tank will be all-solvent, and its temperature will begin to rise since the former modification of its state no longer obtains. An initial rise to 110° C. now takes place whereupon second solenoid valve 14 is caused to open and the contents of the tank drop into the chamber 2, whose working cycle in the meantime will either have reached, or be nearing, completion.

Fluid in the chamber 2 is pure perchloroethene at this point, in practice, and the temperature is raised to the boiling point of that particular solvent, 121° C. Vapor given off is exhausted to the condenser via first pipe 18, heat exchanger 10 and second pipe 19, and heat therefrom is utilized in part to warm the next batch of mingled water, solvent and impurities directed from the machine into the tank 9 following the return of second solenoid valve 14 to closed position.

Thus it comes about that the invention performs the fundamental object set forth, inasmuch as heat from the perchloroethene vapor is utilized to warm a fresh batch of mingled water-and-solvent for recycle, thereby reducing both the heating power requirement for such a process, and water consumption at the condenser stage, as well as cutting the time necessary for distillation.

Most important of all, water which would otherwise act as a vehicle for acidity is drawn off at the relatively low temperature of 87° C. by pre-distillation of the azeotropic mixture of water and solvent.

Likewise of importance, there is no thermal shock induced in the chamber 2, since fluid flowing thereinto does so at a temperature of 110° C. or thereabouts, with no depression being created as a result of sudden condensation of vapor, and in consequence, no need for the installation of any valve by means of which to draw in air from the surrounding environment.

What is claimed is:

1. An apparatus for recycling solvent used in dry-cleaning machines comprising:
    a distillation chamber having heater elements;
    a pre-distillation unit comprising a tank having a first pipeline for receiving mingled water and solvent from a cleaning cycle and a second pipeline connecting the tank to the distillation chamber for discharging the mingled water and solvent into the distillation chamber, and a heat exchanger located within the tank, the heat exchanger being connected to the distillation chamber through a first pipe for receiving vapor from the distillation chamber; and
    a water and solvent vapor condenser connected to the tank through a duct for exhausting into the condenser the vapor produced by predistillation of an azeotropic mixture of water and solvent.

2. The apparatus as defined in claim 1, which further comprises:
    a first solenoid valve placed on the first pipeline for controlling the mingled water and solvent supplied at room temperature into the tank; and
    a second solenoid valve placed on the second pipeline for discharging into the distillation chamber liquid contained in the tank; the first and second solenoid valves being opened alternatively.

3. The apparatus as defined in claim 1, which further comprises a second pipe connecting a top part of the heat exchanger to a top part of the condenser and a third pipe connecting a bottom part of the heat exchanger to a bottom part of the condenser for discharging liquid condensed within the heat exchanger.

4. The apparatus as defined in claim 1, which further comprises an overflow pipe connecting the distillation chamber to the tank and provided with a third solenoid valve.

* * * * *